May 29, 1962 E. BACHER 3,036,761

STORAGE MEANS FOR CALCULATING MACHINES

Filed Sept. 29, 1954 3 Sheets-Sheet 1

INVENTOR

Eric Bacher.

BY [signature]

ATTORNEY

May 29, 1962 E. BACHER 3,036,761

STORAGE MEANS FOR CALCULATING MACHINES

Filed Sept. 29, 1954 3 Sheets-Sheet 2

INVENTOR
Eric Bacher.
BY [signature]
ATTORNEY

May 29, 1962 E. BACHER 3,036,761

STORAGE MEANS FOR CALCULATING MACHINES

Filed Sept. 29, 1954 3 Sheets-Sheet 3

INVENTOR

*Eric Backer.*

BY [signature]

ATTORNEY

United States Patent Office 3,036,761
Patented May 29, 1962

3,036,761

STORAGE MEANS FOR CALCULATING MACHINES

Eric Bacher, Yverdon, Switzerland, assignor to Paillard S.A., Sainte-Croix, Switzerland, a corporation of Switzerland Filed Sept. 29, 1954, Ser. No. 459,156
Claims priority, application Switzerland May 17, 1954
9 Claims. (Cl. 235—61)

This invention relates to digit storing means for calculating machines.

More specifically, this invention relates to an improved digit storing means for use in combination with differential actuating means of known calculators such as those which include denominational orders each having one element capable of being shifted by an amount depending on the digit obtained by operation of said calculator and, reversely, of controlling the introduction of a digit into the calculator in accordance with its occupied position. Such conventional storage means includes, for each denominational order, a movable part cooperating with said element while it occupies as many positions as there are digits in the denominational order, and the movable part is engaged by a locking member.

An object of this invention is to provide an improved storage means which can be effectively used in combination with differential actuating means of known calculating means.

Other objects and features will become apparent from the following detailed description.

Figure 2:
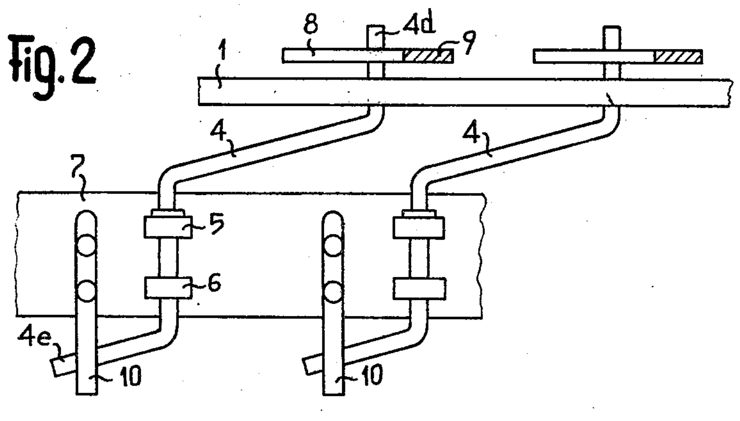
FIGS. 1 and 2 are plan and elevational views of storage means provided for a machine operating in accordance with the quinary calculation system.
Figures 1, 3:
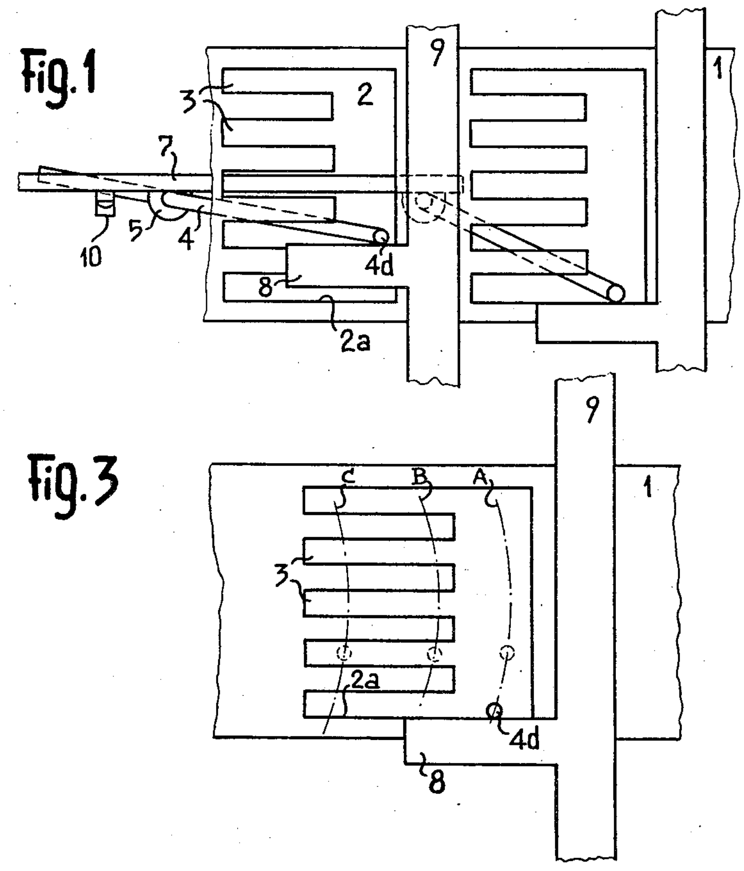
FIG. 3 illustrates the principle of operation of said storage means.

More specifically, FIGURES 1 and 2 show the first embodiment of the multidigit storage device, portions of two unidenominational storage schemes for denominational orders of the calculator M here being illustrated, including plate 1 provided with an elongated opening 2 in each unidenominational scheme. This elongated opening communicates with lateral rectilinear and parallel slots 3, the number of which corresponds to the number of digits contained in a denominational order of the calculating machine for which the storage device is provided. The elongated opening 2 illustrated communicates with five lateral slots 3 which means that the arrangement is designed for a calculating machine each denominational order of which includes five digits, the machine being designed for the execution of calculations in accordance with the quinary calculation system, the quinary calculation system being a numerical system having 5 as its base, as differentiated from the binary calculation system which has 2 as its base and from the decimal system having 10 as its base. Thus, the numbers will be represented in the following three systems, as follows:

| decimal—10 | binary—2 | quinary—5 |
|---|---|---|
| 0 | 0 | 0 |
| 1 | 1 | 1 |
| 2 | 10 | 2 |
| 3 | 11 | 3 |
| 4 | 100 | 4 |
| 5 | 101 | 10 |
| 6 | 110 | 11 |
| 7 | 111 | 12 |
| 8 | 1000 | 13 |
| 9 | 1001 | 14 |
| 10 | 1010 | 100 |

Each unidenominational scheme of the storage device includes a movable part constituting a lever 4 bent into the shape of a crank and pivotally secured inside the superimposed perforated lugs 5 and 6 rigid with a carrier or slide 7. The upper end *4d* of the lever 4 passes through the opening 2 so as to cooperate with a projection 8 rigid with a horizontal rod or read-in slide 9 forming the shiftable element. The storage means including said read-in slide 9 cooperates with the differential actuating means of calculator M, and the read-in slide 9 may be shifted longitudinally under the action of said differential actuating means. A blade spring 10 secured to the carrier or manipulating slide 7 bears against the lower end *4e* of the lever 4 and urges it in a direction such that the upper end *4d* of the lever is held in engagement with the transverse edge *2a* of the opening 2.

The carrier or manipulating slide 7 for the lever 4 is shiftable in a direction parallel with the longitudinal axis of the slots 3, so as to allow the end *4d* of the lever 4 to occupy three different positions illustrated diagrammatically in FIG. 3, as disclosed hereinafter.

The storage device described operates as follows: the inoperative position of the read-in slide 9 and of the lever 4 are illustrated diagrammatically in FIG. 3. As apparent, the end *4d* of the lever is located inside the opening 2 and is urged by the spring 10 against the transverse edge *2a* of said opening.

In this position, the lever end *4d* may be shifted along the path A against the action of the spring 10 by the projection 8 when the latter is shifted with the read-in slide 9 rigid therewith. Said read-in slide 9 forms an element controlled by the differential actuating means of calculator M and is capable of assuming one of five positions corresponding to the five digits of a denominational order of calculator M. For each of said five positions, the end *4d* of the lever is positioned by the read-in slide 9 and the projection 8 in front of that one of the five slots which corresponds to the digit to be retained.

In FIGURE 1 there is shown the position of read-in slide 9 for which the end *4d* of the lever finds itself positioned before the selected slot 3′ by projection 8.

Read-in slide 7 is then shifted so that lever end *4d* is engaged in slot 3′ to be locked therein. Slide or carrier 7 can be so manipulated that end *4d* positions itself either at *4d′* on arc B or at *4d″* on arc C.

When lever end *4d* is brought as far as arc C, viz. position *4d″* on FIGURE 3, it is out of reach of projection 8, and read-in slide 9 is free to occupy other control positions, even positions situated farther from its initial position with respect to slot 31, in accordance with the position selected by means of the machine key. Read-in slide 9 can be operatively associated with the differential actuating means of calculator M.

On the other hand, if lever end *4d* is carried to coincide with arc B, viz. position 4*d* in FIGURE 3, it forms an abutment for projection 8, thereby allowing read-in slide 9 to resume its corresponding position before slot 3', in the shifting action to a point that projection 8 abuts against lever end 4*d* at 4*d'*.

Thus different digits can be stored, dependent upon the slot 3 in which lever end 4*d* will have been locked, and if desired, read-in slide 9 can be caused to resume the position corresponding to the stored digit, although said read-in slide 9 could also be caused to assume other positions between the time of the storage of the digit and the time of its return.

To return the lever end 4*d* into its inoperative position, it is sufficient to manipulate the carrier or slide 7 and to bring said end onto the arc A so that it may engage the edge 2*a* of the opening 2 under the action of the spring 10.

It is thus apparent that the above described storage means may be used in all calculating machines whether mechanical or electrical, wherein at least one element of the mechanism of the machine is adapted to occupy different positions corresponding to the digits to be stored.

Figure 4:
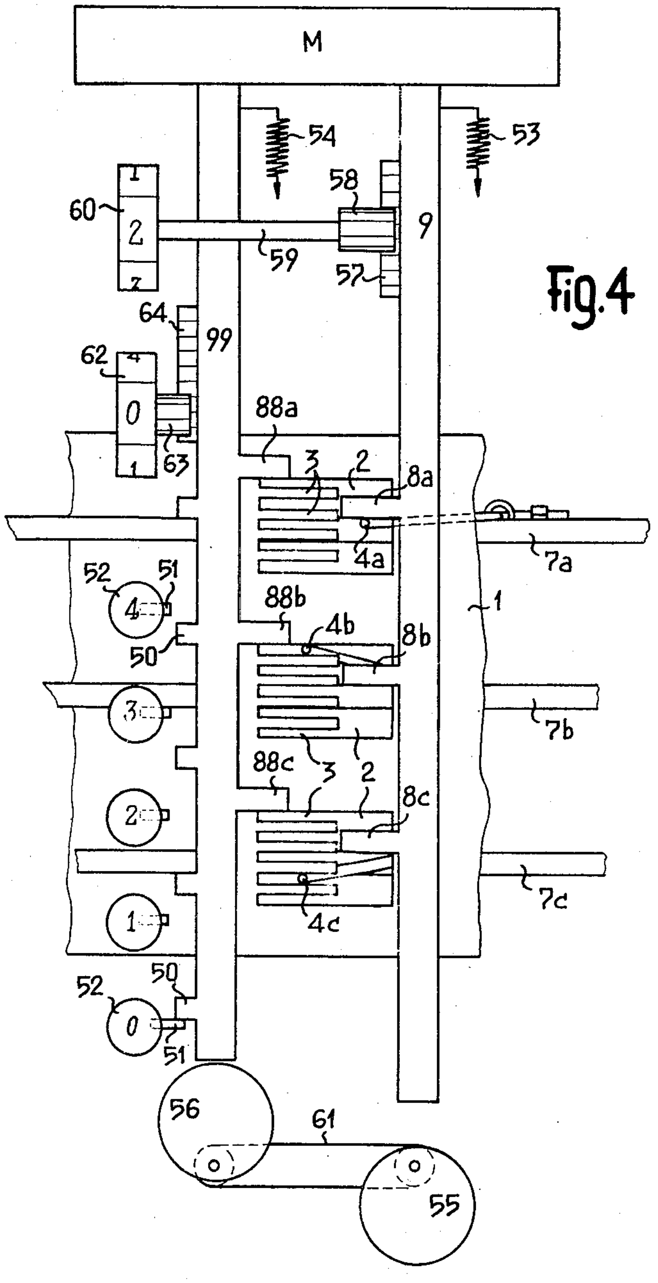
FIGURE 4 is a second embodiment and shows three storage devices for a single denominational order of a calculating machine M.

FIGURE 4 discloses a plurality of storage devices, here shown to be three, for a single denominational order of calculator M.

To this end, each denominational order of the machine, of which only one is illustrated in FIG. 4, includes three pivoted levers constituted by the levers 4*a*, 4*b* and 4*c* carried respectively by the corresponding manipulating slides 7*a*, 7*b* and 7*c*. The latter may be shifted independently of each other in a manner such that each lever may occupy as desired any of three positions A—B—C illustrated in FIG. 3. The three openings 2 corresponding each to one of the levers 4*a*, 4*b* and 4*c* and the lateral slots 3 opening into each of said openings 2 are formed in a common plate 1. As is clearly apparent, pivoted levers 4*a*, 4*b*, and 4*c* constitute settable elements capable of assuming a plurality of positions, here one out of five, in which they may be latched by plate 1 when moved bodily to positions along curves B and C of FIGURE 3, after having been set while unlatched, in position A.

Each denominational order of the calculator M includes in this embodiment, read-in slide 9 and read-out slide 99 each having three projections 8*a*, 8*b* and 8*c* or 88*a*, 88*b* and 88*c* respectively, adapted to cooperate with the corresponding levers 4*a*, 4*b* and 4*c*. Read-in slide 9 is associated with the entire bank of storage devices and is capable of adjusting said levers when they are bodily shifted to position A, as in FIGURE 3. The numerical displacement of the slide, and consequent adjustment of one or more of the settable elements 4*a*, 4*b* and 4*c*, is determined by sensing off a differentially movable element in calculator M, and it is effected by spring 53 in conjunction with cyclic cam 55.

Slide 99 is a read-out element by which values stored may be transmitted to calculator M. This occurs with a selected storage lever 4 occupying position C (FIGURE 3) relative to slide 99, at which time one of its abutments 88*a*, 88*b*, 88*c* will move until it engages a latched and properly aligned lever 4. The motion will be effected by spring 54, in cooperation with cyclic cam 56. The displacement of slide 99 will control and transfer the value to the differential actuator of calculator M. Selection of a particular storage device either for read-in, read-out, or store purposes, viz. positions along curves A, C, and B, respectively, of FIGURE 3, is determined by manipulating slides 7*a*, 7*b*, 7*c* on which levers 4 are pivotally mounted. The unidenominational storage scheme of FIGURE 4 is multiplied, or duplicated, one for each denominational order of calculator M, and each slide 7*a*, 7*b*, 7*c* carries all storage levers 4, viz. of the several denominations, constituting a multidigit storage device (FIGURES 1 and 2). To introduce the stored digit into the lower portion of the storage means, for example slide 7*c* is brought into its extreme left position so that storage lever 4*c* finds itself in the path of projection 88*c* of read-out element 99 which, once freed by cyclic cam 56, will come to abut lever 4*c* under the action of spring 54. The two other portions of the storage means can be operated in the same manner, slides 7*a*, 7*b*, 7*c* being selectively controlled to restore the different stored values. Furthermore, said read-out element 99 also allows introducing into the calculating means M, the digit struck on a keyboard including the keys 52 for the digits 0, 1, 2, 3 and 4. For this purpose, the read-out element 99 carries studs 50 on the side opposed to the projections 88 and adapted to cooperate with the movable stops 51 controlled by the keys 52, the zero key 52 being in depressed position, as clearly shown in FIGURE 4.

Each element 9 or 99 is submitted to the action of a spring 53 or 54 respectively, which urges the corresponding element against an eccentric or cyclic cam 55 or 56, according to the case. These eccentrics or cyclic cams are intended to urge the elements 9 or 99 back against the action of their springs and they revolve in synchronism with each other under the action of a chain transmission 61, said transmission 61 cooperating with the toothed wheels which, in turn, rotate eccentrics 55 and 56, each of said toothed wheels being mounted on a shaft, as clearly shown in FIGURE 4. The keying of said eccentrics or cyclic cams on the corresponding shafts is such that when one of the elements is urged back by its eccentric into its extreme position, the other element is free to move forwardly under the action of its spring.

In the position illustrated in FIG. 4, read-out element 99 is urged into its extreme position by the eccentric or cyclic cam 56 with a view to introducing a digit into the calculating means M. A key 52 is struck and the eccentric or cyclic cam 56 then executes a half revolution so that the spring 54 shifts read-out element element 99 back until a stud 50 thereon engages a stop 51. In the case considered, the key 52 corresponding to the zero has been shown as struck and consequently read-out slide element 99 is allowed no shifting under the action of its spring and it occupies the position for which it introduces a zero into the calculating means M. This zero is also given out by the digit wheel 62 rigid with a pinion 63 engaging a rack 64 rigidly secured to read-out slide element 99. While the element 99 was being released by the eccentric 56, the eccentric 55 urges the element 9 into its extreme position. The two eccentrics or cyclic cams remain then stationary while the operation is performed inside the calculating means. When said operation is at an end, the eccentrics 55 and 56 execute again a half revolution whereby the element 99 is held in or returned into its extreme position while the element 9 is released and moves under the action of its spring 53 until it is stopped by a movable stop which is not illustrated. Said stop forms part of the calculating means M and its position corresponds to the digit of the result to be stored in the denominational order of the calculator M considered. This digit is given out by the digit wheel 60 rigid with a pinion 58 meshing with a rack 57 rigid with the element 9. The movement of the element 9 allows positioning one of the levers 4 of the storage means in the slot 3 corresponding to the digit given out, when the corresponding carrier or slide 7 has been shifted towards the right hand side before actuation of the eccentrics 55 and 56.

In FIG. 4, the manipulating slide 7*a* is shown as having been shifted in this manner and the end of the lever 4*a* lies consequently inside the opening 2. When moving under the action of its spring 53, the read-in element 9 drives through its projection 8*a* the lever 4*a* into register with the slot 3 corresponding to the digit of the result to be stored, said digit being 2 in the case considered. The carrier 7*a* is then shifted slightly towards the left hand side to make the end of the lever 4*a* enter said slot 3 so that said end may be located between the paths followed by the corresponding projections 8*a* and 88*a*, as illustrated in FIG. 4 for the levers 4b and 4c with reference to the corresponding projections.

When the digit recorded by the lever 4a is to be introduced into the calculation means M, the carrier 7a is shifted towards the left so that the end of said lever may be located in the path of the projection 88a. No key of the keyboard is then struck. Thus, when the eccentric or cyclic cam 56 releases the element 99, the latter is shifted by its spring 54 until the projection 88a abuts against the lever 4a. The digit stored by the latter may be read on the digit wheel 62 and is introduced into the calculation means M.

As is quite evident, the operation of the levers 4b and 4c is similar to that of the lever 4a and the arrangement described allows retaining simultaneously a plurality of digits in the same denominational order, as hereinbefore described.

Figure 6:
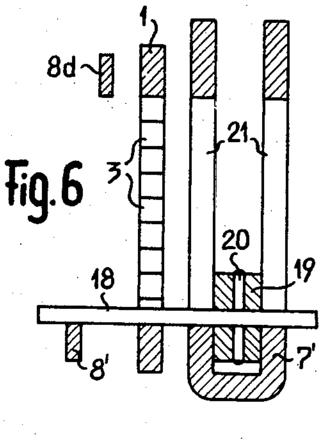
FIG. 6 is a cross-section through line VI—VI of FIG. 5.
Figure 5:
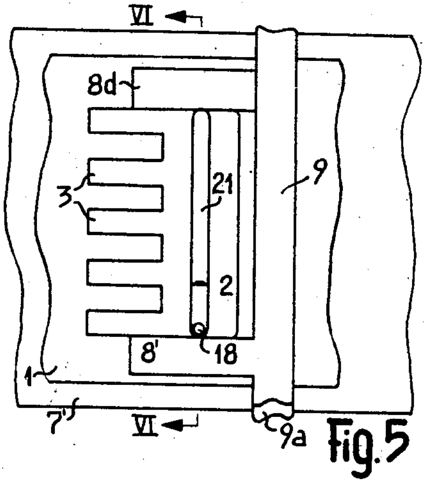
FIG. 5 shows a modified embodiment of the recording device.

FIGS. 5 and 6 illustrate a modification according to which the lever 4 is replaced by a rod 18 rigidly secured to a member 19 by means of a pin 20. The member 19 may slide between the two arms of the U-shaped carrier 7'. The latter is provided with lateral openings 21 facing each other and adapted to guide the rod 18 when it moves inside the elongated opening 2. Furthermore, the rod 18 passing through the openings 21 in the carrier 7' is made fast with said carrier 7', when the latter is shifted so as to lock the rod 18 inside one of the lateral slots 3; the rod 18 is not submitted to the action of a return spring because it is brought into its inoperative position by a second rod 9a including a projection 8d and controlled by an erasing key or by a cam in such a manner as to restore the rod 18 in its lower position shown when it finds itself disengaged from the slots 3 of plate 1.

Figure 7:
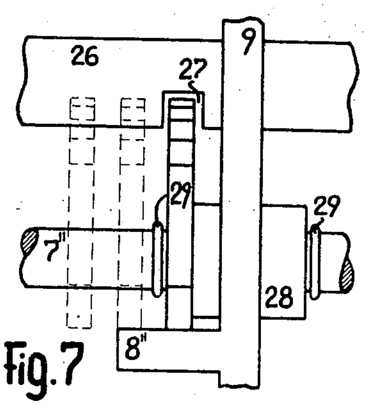
FIGURES 7 and 8 are plan and side elevational views of a further embodiment of a storage means.
Figure 8:
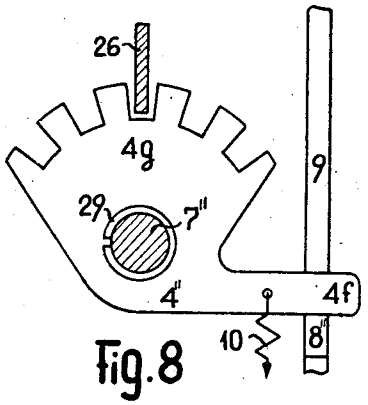

FIGS. 7 and 8 illustrate a further embodiment wherein the lever 4'' is provided itself with locking means, the plate 1 of the preceding embodiments being omitted in this case. The lever 4'' is of the two-arm type and its end 4f is adapted to cooperate with the projection 8'' on the rod 9. The opposite end of the lever 4'' assumes the shape of a toothed sector 4g cooperating with a plate 26 fixed to the calculating machine (not shown), as is clearly evident in FIGURES 7 and 8, so that the lever 4'' may be locked in an angular position selected from a plurality of possible angular positions in accordance with the position which will have been given to it by the sliding element 9. The plate 26 is provided with a notch 27 which allows, when the latter registers with the lever 4'', said lever to rock freely round its carrier 7''. The lever 4'' is rigid with a socket 28 fitted between two rings 29 holding it in position so that it is longitudinally rigid with the carrier 7'' and an axial movement of the latter will shift the lever 4'' beyond the notch 27 in the plate 26, which allows locking said lever through engagement of the plate 26 between the teeth of the toothed segment 4g of the lever. A spring 10 is provided for returning the lever 4'' into its inoperative position.

Figure 9:
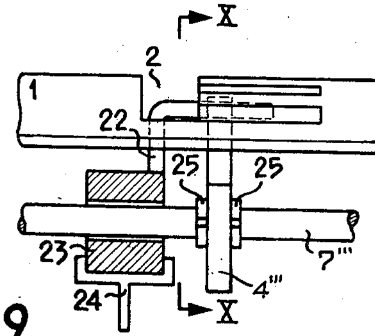
FIGURE 9 shows another embodiment of a storage means.
Figure 10:
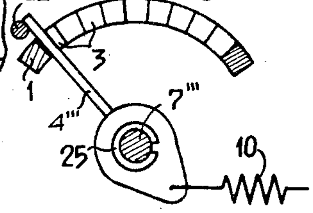
FIGURE 10 shows a section taken on line X—X of FIGURE 9.

A further modification is illustrated in FIGS. 9 and 10. The element constituted in the preceding embodiment by the read-in slide 9 is adapted to assume in this last embodiment a rotary movement. It is constituted by a bent elongated cylindrical member 22, one end of which cooperates with the lever 4''' while its other end is rigid with a socket 23 adapted to revolve around the carrier 7'''. The rotary movement of the socket is controlled by the differential actuating means of the machine through the member 24. The lever 4''' is rotatably mounted on the support 7''' and two retaining rings 25 prevent said lever from being shifted longitudinally of the latter. A spring 10 is again provided for returning said lever into its inoperative position. Furthermore, the plate 1 assumes a cylindrical shape and is provided with digit defining slots 3 as precedingly.

The different embodiments of storage means described hereinabove are designed for the storing of the five digits in a denominational order of a calculating machine provided for executing calculations in accordance with the quinary calculating system, but obviously these arrangements may be modified so as to allow storing the different digits in a calculating machine operating according to any calculating or numbering system.

I claim:

1. In a storage device for a calculating machine, said storage device having a plurality of denominational storage means, each having a predetermined number of digit locations in accordance with the number system employed in the calculator, each denominational storage means comprising an elongated opening, a pivoting element rotatable in said opening transversely of the digit positions by amounts depending on the digits obtained through operation of the calculating machine, an arm adapted to pivot coaxially with said pivoting element and adapted to engage for operation said pivoting element and to occupy as many positions as there are digit locations in the denominational storage means, an arcuate locking member adapted to engage the pivoting arm and to hold same selectively in any of the digit locations of the denominational storage means, a carrier for the pivoting arm adapted to move the pivoting arm transversely of the denominational storage means to shift the latter between three parallel positions, the pivoting arm, when registering with the first of the said positions, being disengaged with reference to the locking member and lying in the path of the pivoting element and being engaged, when registering with the two other positions, by the locking member in the selected digit location, the said two other positions provided for the pivoting arm lying respectively in and outside the path of the pivoting element.

2. In a storage device for a calculating machine, comprising a plate having a plurality of denominational storage means each provided with an elongated opening and a plurality of aligned portions each representing a digit location adjacent said elongated opening, the combination in each denominational storage means of two elements adapted to be shifted across the digit locations, respectively, for storing a digit obtained in the machine and for introducing a digit into the machine, a plurality of lateral projections on each shiftable element, a plurality of movable parts adapted to engage for operation a corresponding projection on either shiftable element and to occupy longitudinally of the corresponding denominational storage means portion as many positions as there are digit locations therein, a locking member including a plurality of sections each adapted to be engaged by the corresponding movable part and to hold same selectively in any of the digit positions, a carrier for each movable part adapted to move each movable part transversely of the denominational storage means to shift the latter into register selectively with either of the corresponding projections and out of register with both projections, the movable part engaging the corresponding section of the locking member when in register with the projection on the second shiftable member and when out of register with both projections and disengaging said section of the locking member when registering with the projection on the first shiftable member.

3. In a storage device for a calculating machine, comprising a plate having a plurality of denominational storage means each provided with a plurality of aligned portions each representing a digit location, the combination in each denominational storage means of two shiftable elements adapted to be shifted across the digit locations, respectively, for recording a digit obtained in the machine and for introducing a digit into the machine, a plurality of lateral projections on each shiftable element, a plurality of movable parts adapted to engage for operation a corresponding projection on either shiftable element and to occupy longitudinally of the corresponding denominational storage means portion as many positions as there are digit locations therein, a locking member including a plurality of sections each adapted to be engaged by the corresponding movable part and to hold same selectively in any of the digit locations of the denominational storage means, a carrier for each movable part adapted to move each movable part transversely of the denominational storage means to shift the latter into register selectively with either of the corresponding projections and out of register with both projections, the movable part engaging the corresponding section of the locking member when in register with the projection on the second shiftable member and when out of register with both projections and disengaging said section of the locking member when registering with the projection on the first shiftable member, a keyboard associated with the second shiftable element to define abutments therefor corresponding to the different digits of the denominational storage means, and means for alternatingly shifting the two shiftable elements through their operative paths defined by the engagement of a movable part with one of their projections and by the operation of the keyboard.

4. In a storage device for a calculating machine comprising a plurality of denominational storage means including a plate having an elongated opening associated with each denominational storage means, each of said denominational storage means having a predetermined number of digit locations adjacent each elongated opening, the combination in each denominational storage means, comprising, a shiftable means for controlling the introduction of a digit into said calculating machine in accordance with its position, said means being shiftable across the digit locations by amounts depending on the resulting digits obtained through the operation of said machine, a movable means in each said elongated opening for engaging said shiftable means, whereby it may occupy longitudinally of the denominational storage means as many positions as there are digit locations therein, a locking means for engaging said movable means and for holding said movable means selectively in any of the digit locations of the denominational storage means, and a carrier means for said movable means for moving the movable means transversely of the denominational storage means, said movable means being operatively connected to said carrier means, whereby said movable means may be shifted transversely between three parallel planes, the first of said planes being in the path of said shiftable means and the other two planes being in and outside the path of said shiftable means, respectively, said movable means being disengaged with respect to said locking means when it registers with the said plane in the path of said shiftable means and being engaged when it registers with one of the other two planes.

5. The storage device of claim 4 including a yielding means for urging said movable means against said shiftable means, said movable means being disengaged with respect to said locking means.

6. The storage device of claim 4 wherein said locking means includes a plurality of parallel notches arranged transversely of said denominational storage means and cooperating with said elongated opening in a common plane, whereby the digit locations for said movable means are defined through selective engagement with one of said notches.

7. The storage means of claim 4 including a yielding means for urging said movable means against said shiftable means when said movable means is disengaged with respect to said locking means, said yielding means comprising a spring member secured to said carrier means, and wherein said locking means includes a plurality of parallel notches arranged transversely of the denominational storage means and cooperating with said elongated opening in a common plane to define the digit locations for said movable means through selective engagement of one end of said movable means in one of said notches, said movable means being pivotally secured to said carrier means about an axis perpendicular to the plane of said notches.

8. The storage device of claim 4 wherein said locking device includes a plurality of parallel notches arranged transversely of said denominational means and cooperating with said elongated opening in a common plane, whereby the digit locations for said movable means are defined through selective engagement with one of said notches, and comprising means for returning the movable means longitudinally of the denominational storage means into contact with the shiftable means, said movable means comprising a rod member.

9. In a storage means for a calculating machine having a plurality of denominational orders, the combination including a plurality of denominational storage means, read-in slide element means for controlling the introduction of a digit into said calculating machine in accordance with the position of said digit, said means being shiftable depending on the resulting digits obtained through the operation of said machine, movable means for engaging said shiftable means, whereby said shiftable means may occupy longitudinally of the denominational storage means as many positions as there are digit locations therein, locking means for engaging said movable means and for holding said movable means selectively in any of the digit locations of the denominational storage means, and carrier means for said movable means for moving said movable means transversely of the denominational storage means between three parallel planes, said movable means, when in registry with the first of said planes, being disengaged from said locking means and being in the path of said shiftable means, and when in registry with one of the other two planes, being engaged with said locking means.

References Cited in the file of this patent

UNITED STATES PATENTS

| | | |
|---|---|---|
| 1,878,125 | Fuller | Sept. 20, 1932 |
| 2,472,519 | Carlsen | June 7, 1949 |
| 2,540,226 | Williams | Feb. 6, 1951 |
| 2,666,573 | Tenoort | Jan. 19, 1954 |
| 2,714,989 | Ellerbeck | Aug. 9, 1955 |
| 2,744,684 | Buzzi | May 8, 1956 |